United States Patent
Ogawa et al.

[15] 3,684,061
[45] Aug. 15, 1972

[54] DISC BRAKE

[72] Inventors: Tokuo Ogawa, Tsushima; Tatsumi Sakano, Nagoya; Shigeyoshi Okamura, Aichi-ken, all of Japan

[73] Assignee: Toyota Jidosha Hanbai Kabushiki Kaisha, Nagoya-shi, Aichi-ken, Japan

[22] Filed: May 1, 1970

[21] Appl. No.: 33,707

[30] Foreign Application Priority Data

May 8, 1969 Japan ...................... 44/35856
June 3, 1969 Japan ...................... 44/46294
June 12, 1969 Japan ...................... 44/43859

[52] U.S. Cl. ............ 188/73.5, 188/264 B, 188/264 G
[51] Int. Cl. ............................................. F16d 65/02
[58] Field of Search .... 188/73.5, 73.1, 205 A, 250 B, 188/264 B, 264 G

[56] References Cited

UNITED STATES PATENTS

| | | | |
|---|---|---|---|
| 2,214,104 | 9/1940 | Hildabott et al. | 188/264.1 |
| 3,429,405 | 2/1969 | Frigger | 188/73.5 |
| 3,490,563 | 1/1970 | Hahm | 188/73.5 |

*Primary Examiner*—George E. A. Halvosa
*Attorney*—Berman, Davidson and Berman

[57] ABSTRACT

A disc brake of simple construction wherein an intermediate member such as a metal powder sintered product retaining lubricating material such as oils and fats is provided between the pad and the piston, and a protecting cover is fitted to said intermediate member to prevent the leakage of said lubricating material and to retain the lubricating material for a long time, thereby reducing the frictional force between opposed surfaces of the pad and the piston and preventing brake squeal for a long time.

13 Claims, 19 Drawing Figures

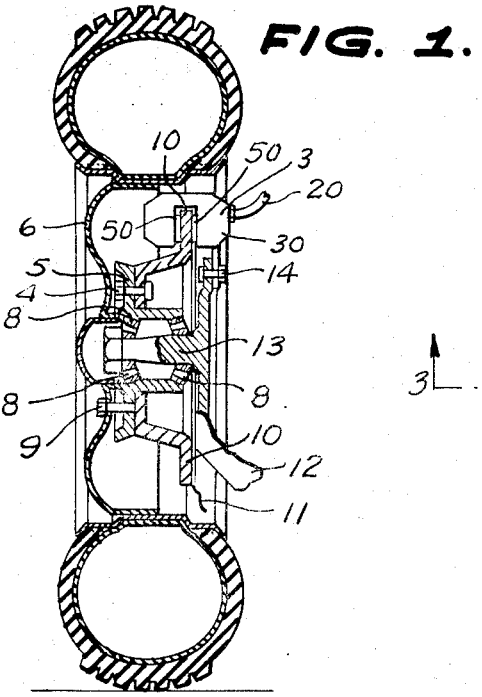
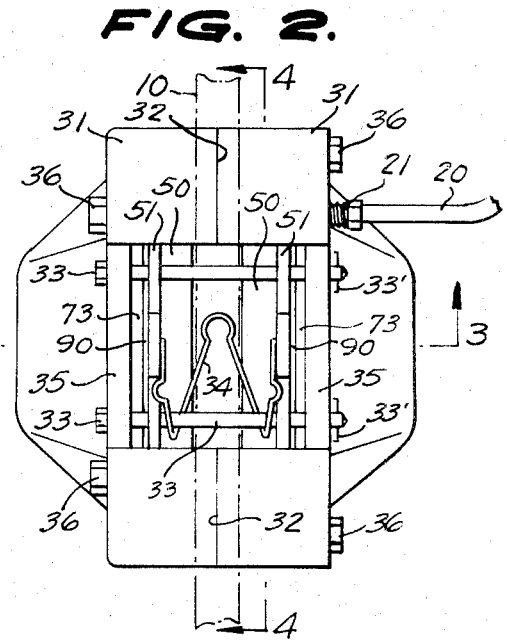
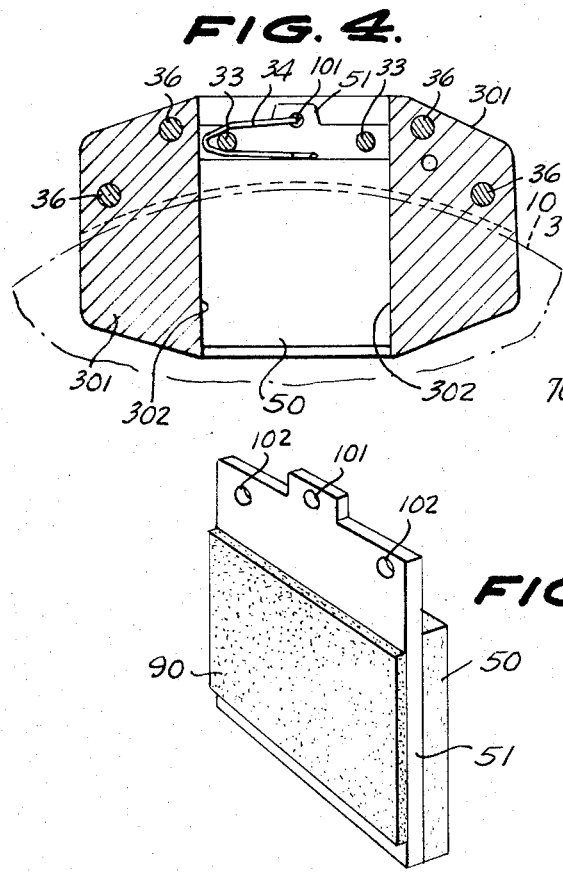
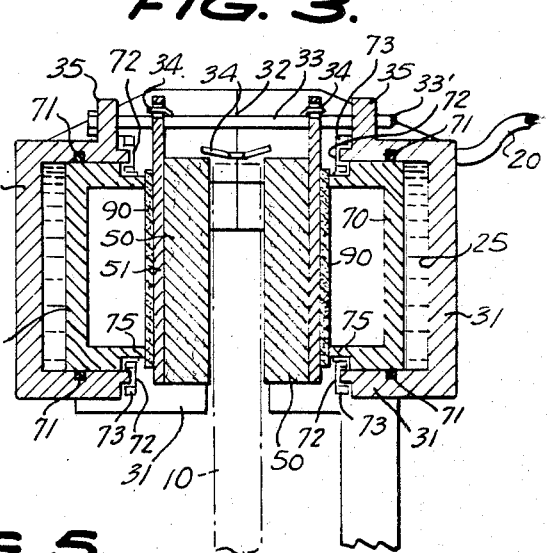
INVENTORS
TOKUO OGAWA,
TATSUMI SAKANO,
SHIGEYOSHI OKAMURA,
BY Berman, Davidson & Berman,
ATTORNEYS.

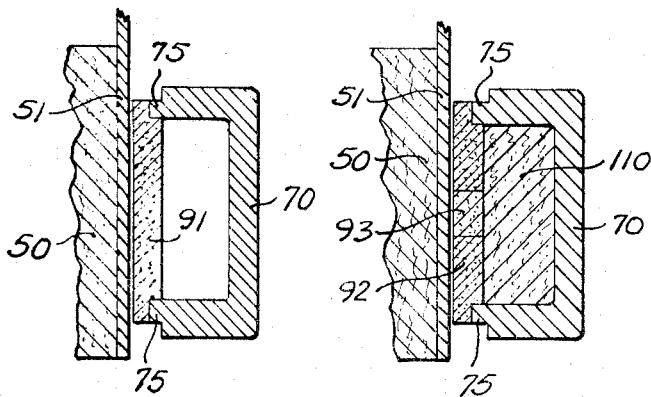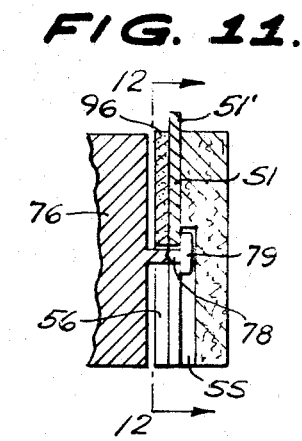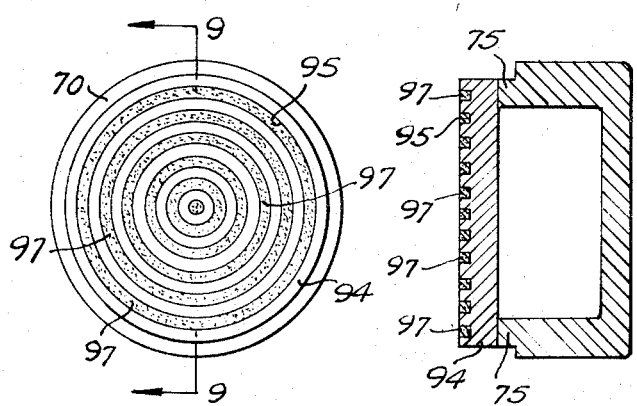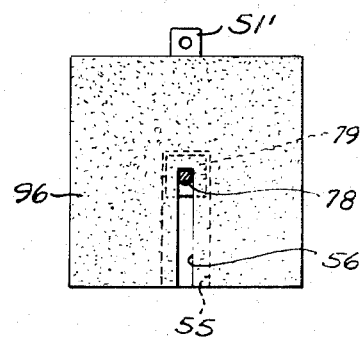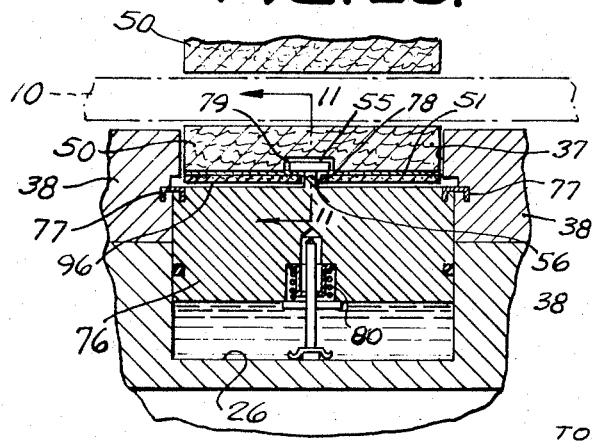

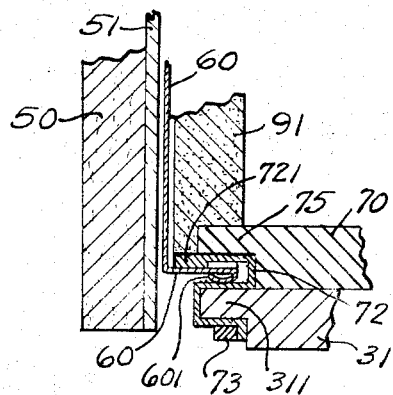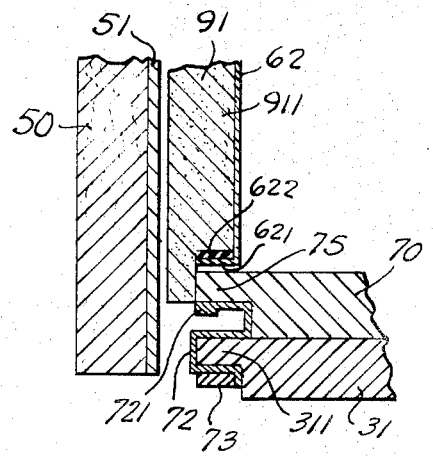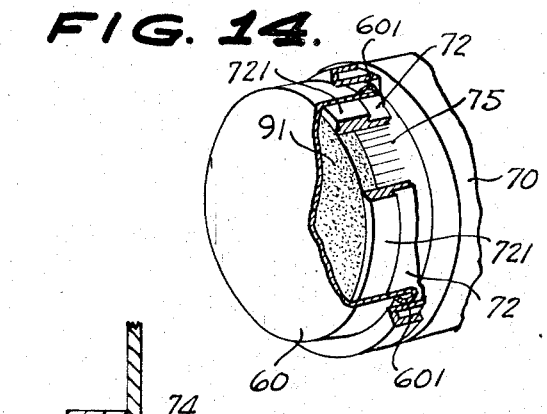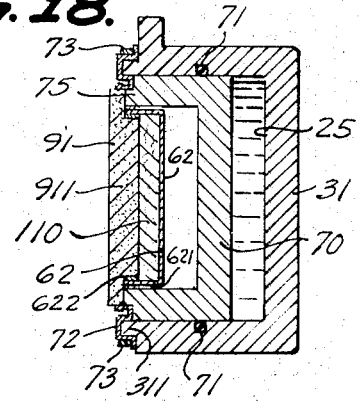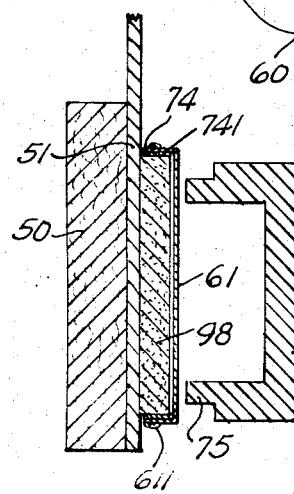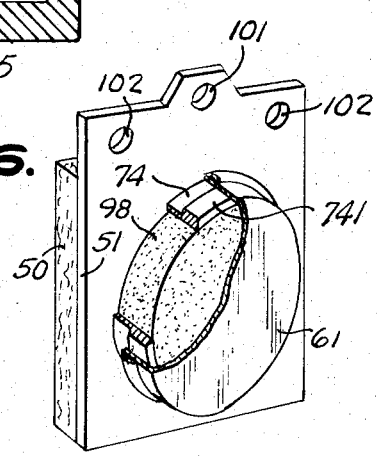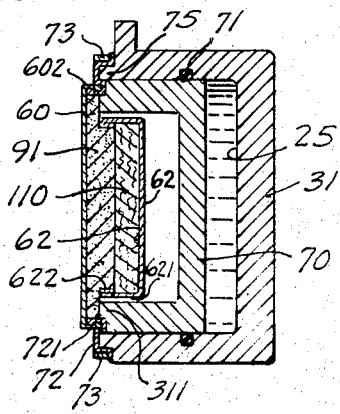

DISC BRAKE

BACKGROUND OF THE INVENTION

The present invention relates to disc brakes of the kind in which at least one pad is engaged with the opposed surface of a brake disc associated with the motor vehicle's wheel, or the like, and rotated therewith, at least one piston arranged on the opposite side of said pad, and hydraulic actuating means for pressing said piston are provided in a caliper which straddles a portion of the periphery of the disc, and the hydraulic means presses the pad against the disc through the piston to brake the rotation of the disc.

In conventional disc brakes of the above-described type an uncomfortable and objectionable "brake squeal" occurs when the brakes are applied.

A great many attempts and practices have been made heretofore in the improvement of frictional material and the method of damping, none of which, however, has accomplished the essential object of preventing the above-described brake squeal.

The present invention has been achieved by experiment and analysis from which it was learned that the described brake squeal arises from the torsional vibration of the pad in pressing the pad against the brake disc and the resultant vibration of the brake disc. The torsional vibration of the pad is produced by frictional torque between the pad and the brake disc because there is a distance, equal to the thickness of the pad, between the point of action of the pressing force by piston, or the like, and that of the frictional force on the disc surface. It was further determined that said torsional vibration can be removed by minimizing the friction between the pad and the pressing means such as the piston.

It is a primary object of the present invention to provide disc brakes in which brake squeal is prevented.

It is another object of the present invention to provide disc brakes in which brake squeal is prevented for a long time.

It is a further object of the present invention to provide means for preventing brake squeal which can be applied to conventional disc brakes.

It is still further object of the present invention to provide means for reducing the frictional force between the pad and the piston and keeping said force small for a long time.

SUMMARY OF THE INVENTION

The objective of preventing the brake squeal for a long time with a simple construction has been attained in the present invention by providing an intermediate member retaining lubricating material such as oils and fats between opposed contact surfaces of the pad and the piston. The intermediate member may be attached to either the pad or the piston. Preferably the side peripheral surface and the surface opposite the contact surface of said intermediate member are covered with a protecting cover having a bottom, the sidewall of said protecting cover being fixed at the side peripheral surface of said intermediate member by means of a resilient material such as heat-resisting rubber. The inner bottom surface of said protecting cover may be engaged by the intermediate member, or, a space may be provided to receive additional lubricant.

BRIEF DESCRIPTION OF THE DRAWINGS

The invention will best be understood from the following description of specific embodiments when read in connection with the drawings, wherein like reference characters indicate like parts throughout the several Figures, and in which:

FIG. 1 is a central vertical sectional view showing a disc brake according to the present invention on an automobile wheel;

FIGS. 2 to 9 show embodiments in which the present invention is applied to a Gerling type disc brake, wherein;

FIG. 2 is a plan view of a first embodiment;

FIG. 3 is a vertical section taken along the line III—III of FIG. 2;

FIG. 4 is a vertical section taken along the line IV—IV of FIG. 2;

FIG. 5 is a perspective view of a pad;

FIG. 6 is a vertical section of essential parts of opposed surfaces of a piston and a pad incorporated in a second embodiment;

FIG. 7 is a vertical section of essential parts of opposed surfaces of a piston and a pad incorporated in a third embodiment; and FIGS. 8 and 9 show a fourth embodiment, in which FIG. 8 is a front elevation of the piston and the pad arranged opposite one another, and FIG. 9 is a vertical section of essential parts of the piston taken along the line IX—IX of FIG. 8;

FIGS. 10 to 12 show a fifth embodiment of the present invention applied to a Dunlop type disc brake, wherein; FIG. 10 is a transverse section of essential parts of the piston and pad portions; FIG. 11 is a vertical section taken along the line XI—XI of FIG. 10; and FIG. 12 is a front elevation of the pad arranged opposite to the piston, taken along the line XII—XII of FIG. 1;

FIGS. 13 to 19 show additional embodiments of the present invention applied to a Gerling type disc brake, wherein; FIGS. 13 and 14 show the sixth embodiment of the present invention, in which FIG. 13 is a partly broken, enlarged, sectional view of opposed surfaces of a pad and a piston, and FIG. 14 is a partly broken perspective view of a forward end of the piston; FIGS. 15 and 16 show the seventh embodiment of the present invention, in which FIG. 15 is a vertical section of opposed surfaces of a pad and a piston, and FIG. 16 is a partly broken perspective view of opposed surfaces of a pad and a piston; FIG. 17 is a partly broken, enlarged, sectional view of opposed surfaces of a pad and a piston, showing the eighth embodiment of the present invention; FIG. 18 is a vertical section of the piston side of the brake assembly, showing the ninth embodiment of the present invention; and FIG. 19 is a vertical section of the piston side of the brake assembly, showing the tenth embodiment of the present invention.

DESCRIPTION OF THE PREFERRED EMBODIMENTS

In order to make the present invention readily understood, an explanation to provide a general conception of a disc brake will be made with reference to FIG. 1, wherein a disc brake is associated with a front wheel of an automobile. According to the drawing, a wheel disc 6 and a brake disc 10 are rigidly fixed with bolts 9 and 4 on a hub 5 provided through bearing 8 on a shaft 18 of a steering knuckle 12 connected to a chassis. There is provided a braking mechanism 3 straddling the disc 10 and secured to steering knuckle 12 with bolt 14, while the chassis side of the disc 10 is provided with a dust cover 11 fixed to the steering knuckle 12.

In the described braking mechanism 3, pads 50, which may be formed of conventional friction, or brake material, are supported in opposite sides of the caliper 30 and are disposed on both sides of the brake disc 10. The lower portion of caliper 30 is rigidly fixed to a hydraulic pipe nozzle 21 which is connected to a hydraulic pipe 20 leading to a master cylinder (not shown).

The first to fifth embodiments of the present invention comprise an intermediate member retaining a lubricating material, such as oils and fats, and disposed between opposed contact surfaces of a pad 50 and a piston for pressing said pad to the disc, both supported in the caliper 30 wherein the friction between said opposed contact surfaces is reduced and the torsional vibration of the pad is eliminated. A more detailed description of the invention will be made in connection with the embodiments illustrated in the following figures of the drawings.

FIGS. 2 to 5 show a Girling type disc brake in which the caliper 30 constituting the principal part of the braking mechanism 3 consists of two half portions 31 arranged opposite one another. The major portion of the caliper between the opposed surfaces of half portions 31 provides a space in which the brake disc 10 rotates. The two half portions 31 abut at their connecting surface 32 and are rigidly fixed together by bolts 36. Cylinders 25 are formed in opposite portions 31 which open towards the disc brake 10, and pistons 70 are respectively fitted into said cylinders. At the forward ends of pistons 70 are provided the pads 50 which are pressed against the brake 10 by the pistons.

As best shown in FIG. 5, the pad 50 is provided with a backing plate 51 to which a porous plate 90 made of sintered iron powder and impregnated with grease is attached.

The backing plate 51 is made of metal and serves to prevent the contact of the pad with grease and to suspend and reinforce said pad 50. At the upper part of the pad backing plate 51 are provided two holes 102 for suspending the pad and a hole 101 for engaging a spring 34.

In the center of caliper 30 there is a space formed by inner side walls 302 of sleeves 301 thereof, FIG. 4. In said space are provided two detachable rods 33 between fixed walls 35 respectively provided at the upper part of the opposed surfaces of the caliper. Said rods held in place by pins 33' are loosely fitted into the holes 102 of the pad packing plates 51 to suspend two pads 50 with their friction surfaces opposed to the opposite sides of disc 10. The spring 34 is bent into M shape and each of its two side legs has three bent portions which bear against plate 51 and press a porous plate 90 on the back surface of pad 50 against its adjacent piston 70. The curved portions of spring 34 are engaged over one of the rods 33. Each free end of the side legs of spring 34 is engaged in the hole 101 of one of the pad backing plates 51, whereby the pad 50 is pressed toward its adjacent piston 70 by resilient force of the spring 34. As thus disposed, a pertinent interval is formed between the friction surfaces of pads 50 and the surfaces of the brake disc 10.

The piston 70 for pressing the pad 50 against the brake disc 10 is of a cylinder shape with a bottom. The bottom surface of the piston is arranged next to the working oil within the cylinder 25, and the forward open end 75 of the piston is disposed in the opening of the cylinder 25 adjacent to the back surface of the pad 50. In an annular groove provided on the inner peripheral surface of the cylinder 25 is secured an O-ring 71 to maintain the fluid-tightness between the outer peripheral surface of the piston 70 and the inner peripheral surface of the cylinder 25. Between the outer peripheral surface of the forward end 75 of the piston 70 and the caliper 30 and secured in engagement with both of them is a ring-shaped boot 72 for preventing entrance of dust.

Both cylinders 25 are connected through an oil path (not shown) provided in the half portions 31 of the caliper 30 and communicated at a portion 32 where said half portions 31 are connected. A hydraulic pipe 20 leading to a master cylinder (not shown) is attached to the nozzle 21 connected to said oil path.

The disc brake in accordance with the first embodiment is formed as described above so that the pressure working oil is conducted into each cylinder 25 from the master cylinder in order to brake the rotating disc 10. Each piston 70 slides in the cylinder and its forward end 75 presses the porous plate 90 at the back surface of the pad 50 toward the disc 10. The pad 50 pressed at its back surface is moved by plate 90 toward the brake disc 10 along the rod 33, loosely fitted into holes 102 at the upper part of the backing plates 51, pressing the rotating disc 10, and the frictional force between the pad 50 and the brake disc 10 brakes the rotation of the disc 10.

As the grease impregnated porous plate 90 is provided at the back surface of the pad 50 to be contacted by the forward end 75 of the piston, the frictional force between the contacting surfaces is greatly decreased by lubrication of the grease, and such friction becomes extremely small as compared with the frictional force between the brake disc 10 and the pad 50. The pad 50 slides in the rotational direction of the brake disc 10 relative to the forward end 75 of the piston within the allowance of the clearance between the hole 102 of each pad backing plate 51 and the rod 33, and the frictional force between the brake disc 10 and the pad 50 is converted into the braking force with the contact area of the past against the inside wall 302 of the caliper sleeve 301 as a point of reaction force. During braking the frictional force between the forward end 75 of the piston and the pad 50 through the pad backing plate 51 is so small, as mentioned above, that it generates no torsional vibration, thereby preventing the occurrence of brake squeal.

Since a porous plate 90 made of sintered iron powder and impregnated with grease is used, the lubricating capacity is perpetual. There is further obtained a damping effect because of the appreciable flexibility of the porous plate 90, so that the prevention of the brake squeal is more effective. Because of the flexibility of the porous plate 90, grease is released between the slidable surfaces of the pad 50 and the piston 70 at the time of braking. During times of non-braking grease is absorbed in the pores of the porous plate 90 by recovering from flexion, whereby grease is maintained for a long time and the deterioration of lubricating capability is avoided.

The second embodiment of the present invention is shown in FIG. 6, and is in all respects similar to the first embodiment except that a porous plate 91, impregnated with grease and similar to the plate 90, is secured to the forward end 75 of the piston instead of to the backing plate 51. The porous plate 91 has a main body portion having the same outer diameter as that of the forward end 75 of the piston and a thickened central portion having the same outer diameter as the inner diameter of said forward end 75 to project slightly into the piston 70 for frictional securement thereto.

In the second embodiment, the same mode of functioning and effect are obtained as in the first embodiment with the only difference being that the porous plate 91 is securely connected to the piston. In a modification of this embodiment, the porous plate 91 can be formed in an annular shape of the same inner and outer diameters as the forward end of the piston and rigidly fixed to the forward end of the piston by sintering. In these embodiments, the pad 50 having the backing plate 51 is used.

The third embodiment of the present invention is shown in FIG. 7, and is in all respects similar to the second embodiment except that the porous plate 92 of the iron powder sintered material having the same shape as plate 91, FIG. 6, is fitted to the forward end 75 of the piston 70. In plate 92 the density of sintered material is smaller in middle part 93 than in the peripheral part so that more grease is released from part 93 than the remainder of plate 92. The density of sintered material is higher in the peripheral part so that the strength of the porous plate 92 is increased. A further difference over FIG. 6 is that asbestos 110 impregnated with grease is filled into the interior space of the piston 70, contained between porous plate 92, the cylindrical wall and the bottom of the piston, so as to increase the amount of grease available in the brake assembly.

Thus the third embodiment of the invention functions in the same way and has the same effects as the first embodiment.

The fourth embodiment of the invention is shown in FIGS. 8 and 9, as substituting a circular, aluminum plate 94 having concentric circular grooves 95 for plate 91, FIG. 6. Plate 94 is fixed to the forward end 75 of the piston 70 opposite the pad backing plate 51 with the grooves 95 holding asbestos 97 impregnated with grease. This embodiment is otherwise similar to the previously described embodiment and has the same effect of preventing the occurrence of brake squeal. Plate 94 can be manufactured at lower cost than sintered plate.

The fifth embodiment of the invention is shown in FIGS. 10 to 12, wherein a porous plate 96 made of iron powder sintered material and impregnated with grease is provided on the surface of the pad 50 opposed to the piston 76 in a disc brake of the Dunlop type.

From FIG. 10 it may be seen that solid piston 76 is fitted into a cylinder 26 formed in a caliper 38, the piston being slidable on the inner peripheral surface of the cylinder. On the opposed surfaces of the bottom of piston 76 and the bottom of the cylinder 26 is provided an automatic returning and space correction device 80 of conventional construction. A ring-shaped rubber boot 77 is provided between the periphery of the forward end of the piston 76 and the caliper 38, in engagement with both of them. At the middle of the forward end of said piston is integrally formed a projection 78 having an engaging head 79.

A porous plate 96 impregnated with grease is attached to the pad 50 opposite the piston 76, through the pad backing plate 51, the porous plate 96 and the backing plate 51 having a groove 56 cut from their centers to their lower ends for receiving piston projection 78, and the pad 50 has a groove 55 connected to groove 56 for receiving head 79. The pad 50 can be freely attached or detached from the piston 76 by inserting or removing projection 78 with head 79 of the piston 76, respectively, from grooves 56 and 55 of the pad.

In the fifth embodiment, when the pad 50 is pressed against the rotating brake disc 10 by the piston 76 at the time of braking, the pad 50 slides in the rotational direction of the brake disc 10 within the allowance of the clearance between the piston projection 78 and the groove 56 and then contacts the side wall 37 of the caliper 38 to effectuate braking. The friction between the grease impregnated porous plate 96 and the piston 76 is small as in the first embodiment and the torsional vibration of the pad is avoided, thereby preventing brake squeal.

Similar effect can also be obtained by a modification of the fifth embodiment in which the porous plate 96 is fixed or sintered at the forward end of the piston 76 as that the pad backing plate 51 slides along the porous plate 96.

In the sixth and seventh embodiments of the invention, an intermediate member retaining lubricating material such as oils and fats is provided on either one of the contact opposed surfaces of the pad and the piston, and a protecting cover is fitted on the contact surface of said intermediate member opposite to the pad or the piston. The friction between the opposed surfaces of the pad and the piston is reduced to eliminate the torsional vibration of the pad, and the leakage, evaporation and pollution of the lubricating material is avoided by the protecting cover. A more detailed description will be made on embodiments shown in FIGS. 13 to 16, wherein the present invention is again applied to a Gerling type disc brake.

FIGS. 13 and 14 show the sixth embodiment of the invention, in which a protecting cover 60 is provided on the surface of a porous plate 91 similar to that shown in the second embodiment (FIG. 6), opposed to the pad 50 and backing plate 51. A ring shaped boot 72 of heat- and oil-resisting soft rubber for preventing entrance of dust is provided between the forward end 75 of the piston and the forward end 311 of the half portion 31 of the caliper, in engagement with both of them.

The boot 72 has a cross-section in its diametrical direction almost of a Z-shape with its lower opening fitted to the forward end 311 of the caliper half portion 31 and its upper end (inner peripheral surface of the ring boot) fitted to the outer peripheral surface of the forward end 75 of the piston. The boot 72 is fixed at the forward end 311 by a fixing ring 73 closely fitted to the outer periphery of the boot 72.

At the forward end 75 of the piston there is employed a circular porous plate 91 impregnated with grease as an intermediate member for maintaining a supply of lubricating material. Plate 91 has a peripheral projecting flange which is fitted to the edge of the inner peripheral wall of the piston.

The protecting cover 60 is of shallow, cylindrical shape having a bottom and is fitted detachably to the porous plate 91. Cover 60 has a flat bottom surface and a side wall having a forward end 601 bent outwardly in a rounded, beadlike shape. By inserting the forward end 601 of the cover 60 into the inner opening of the ring boot 72, the inner periphery of the side wall of said cover 60 is fitted to the projection 721 provided on the inner peripheral surface of said boot opening, and thereby the inner bottom surface of said cover is contacted against the surface of porous plate 91 opposite the pad 50. The projection 721 of the boot acts as a resilient body, the outer diameter of which is appreciably larger than the inner diameter of said cover 60 which thereby is fixedly secured to the boot 72.

The opposed surfaces of the protecting cover 60 and the pad backing plate 51 have no lubrication and therefore the frictional force between them is large. However, the frictional force between the opposed surfaces of the protecting cover 60 and the porous plate 91 is greatly reduced by lubrication of grease. The inner peripheral surface of the side wall of said protecting cover 60 is resiliently engaged by the projection 721 of the soft rubber boot 72, and due to the large frictional force between the pad 50 and the cover 60 during braking, the pad 50 slides with the cover 60 in the rotational direction of the brake disc 10 relative to the porous plate 91 at the forward end of the piston within the allowance of the clearance between the hole 102 of each pad backing plate 51 and the rod 33, as previously explained in connection with FIGS. 1 – 5. This converts the frictional force between the brake disc and the pad 50 into braking force with the contact point of the pad against the inside wall 302 of the sleeve 301 of the caliper 30 as a point of reaction force.

Normally the frictional force between the pad backing plate 51 and the forward end 75 of the piston would cause torsional vibration on the pad 50, however in this case, the frictional force between the protecting cover 60 and the porous plate 91 at the forward end 75 of the piston, is extremely small, and as a result the mentioned torsional vibration is avoided, thereby preventing brake squeal.

Grease for reducing the frictional force between the pad 50 and the piston 70 is applied in porous plate 91, the outer surface of which is sealed by the protecting cover 60 as above described, so that grease will not leak nor evaporate to the outside due to frictional heat generated between the disc 10 and the pad 50, or between the pad 50 and the side wall of the caliper during braking. Further, flow-out or pollution of the grease by invasion of water or dust from the outside, or pollution of the grease emanating from the forward end of the piston and the pad backing plate 51 of the forward end of the piston and the pad backing plate 51 of the pad are prevented. The lubricating capacity is therefore, permanent.

It is possible to obtain a damping effect during braking by making the porous plate 91 appreciably flexible of iron powder sintered material retaining grease, thereby preventing brake squeal more effectively. With a flexible plate 91, it is possible to release grease between the contact surfaces of the inner bottom of the protecting cover 60 and the porous plate 91 during braking, and to absorb the grease in the pores of the plate 91 when the latter recovers its initial form during non-braking, so that grease is maintained for a long time and its deterioration is prevented.

Because the forward end 601 of the side wall of the protecting cover 60 is bent outwardly in a rounded shape, as described above, the boot is not damaged by the cover during initial attachment or any subsequent vibrations.

According to other embodiments of the present invention, heat-resisting fibers impregnated with grease may be filled in between the porous plate 91 and the inner peripheral surface of the piston 70 in the sixth embodiment (FIGS. 13—14) so as to increase the content of the grease, as in the third embodiment (FIG. 7).

Further, in the sixth embodiment, the porous plate 91 and the inner peripheral surface of the piston 70 may be fitted loosely with some clearance so that the porous plate 91 may appreciably vibrate in said clearance during braking, and thus exhibit a better effect in preventing brake squeal.

The seventh embodiment of the invention is shown in FIGS. 15 and 16, as including a porous plate 98 impregnated with grease and a protecting cover 61, the plate being attached to the surface of the pad backing plate 51 which is opposed to the piston, instead of a similar plate 91 and cover 60 disposed at and secured to the forward end 75 of the piston as shown in the sixth embodiment. The plate 98 is cylindrical and made of iron powder sintered material impregnated with grease. This plate is adhered to pad backing plate 51 by an adhesive having strong adhesion. On the peripheral surface of plate 98 is fitted a rubber ring 74 having an outward projection 741 on the outer peripheral surface, and a cylindrical protecting cover 61 is detachably secured to said ring 74 in the same manner as in the sixth embodiment. The outer diameter of the projection 741 of the ring 74 is appreciably larger than the inner diameter of the side wall 611 of the protecting cover 61 so that the ring and cover are closely fitted.

In the seventh embodiment, the protecting cover 61 is brought into close contact with the forward end 75 of the piston by a large frictional force between them, and the same effect is obtained as in the sixth embodiment.

The above are the descriptions of embodiments wherein a porous plate is employed as an intermediate member for retaining and supplying the lubricating material. The intermediate member may be an iron plate, such as stainless steel, having a shallow spiral or grid-shaped groove on its contact surface, and in such case, the lubricating material may be provided directly in said groove, or together with heat-resisting fibers. Furthermore, head-resisting soft rubber is used as a resilient body between the side peripheral surface of the intermediate member and the inner surface of the side wall of its protecting cover, but said resilient body may be of oil- and heat-resisting plastic or the like having resiliency, and it may be manufactured integrally with a boot as shown in the sixth embodiment (FIGS. 13–14).

In the eighth to tenth embodiments of the present invention, a porous plate holding the lubricating material, such as oils and fats, is provided between the opposed surfaces of the piston and the pad and attached to the piston. A protecting cover is fitted on the surface of the porous plate opposed to a concave portion of the piston. The friction between said opposed plate and piston contact surfaces is reduced by the lubricating material, thereby eliminating the torsional vibration as in the embodiments previously described. A more detailed explanation will be made in regard to embodiments shown in FIGS. 17 to 19.

The eighth embodiment is shown in FIG. 17, wherein a tray 62 is provided on the piston side of the porous plate 91 impregnated with grease similar to that shown in the second embodiment (FIG. 6).

The porous plate 91, secured to the forward end 75 at the opening of the piston, has a stepped portion engaged with the forward end of the piston, at the periphery of its back surface, the cross-section thereof being preferably convex shape, wherein grease is applied to its whole body and a tray 62 for preventing the leakage of grease is secured to a projection 911 forming a thickened portion of the porous plate 91, and said projection 911 is loosely fitted, with a clearance, into the opening of the piston.

Between the inner surface of wall 621 of the cover and the side wall of the projection 911, there is provided an oil-proof soft rubber ring 622, and since the inside diameter of wall 621 is a little smaller than the outer diameter of the rubber ring, the ring does not come off during use. The cover 62 is quite closely fitted to the surface of the projection 911 and seats with clearance within the cavity of the piston 70.

The opposed surfaces of the porous plate 91 and the pad backing plate 51 are parallel and slightly spaced apart. They extent at right angles to the direction of movement of the piston 70 and the pad 50.

As described, the eighth embodiment is constructed quite similar to the second embodiment (FIG. 6), the occurrence of brake squeal is prevented in the same manner. Further the leakage of grease into the concave portion of the piston is prevented and the grease is retained for a long time by the cover so that brake squeal is prevented for a long time.

As mentioned above, there is a clearance between the outer peripheral surface of the tray 62 and the inner peripheral surface of the concave portion of the piston, so that during braking the porous plate 91 vibrates parallel to the pad backing plate 51 within said clearance. As a result, the frictional force between the forward end 75 of the piston and the pad backing plate 51 is further reduced.

The ninth embodiment of the invention is shown in FIG. 18, wherein the depth of the protecting cover 62 of the eighth embodiment is increased to form a space between the projection 911 of the porous plate 91 and inner bottom surface of the tray 62. This space is filled with asbestos fiber 110 including grease in the same manner as in the third embodiment (FIG. 7).

The same results are obtained with the ninth embodiment as with the eighth embodiment, but in addition, when the supply of grease in the porous plate becomes short, grease in the asbestos fiber 110 passes into the porous plate 91 to keep the porous plate always fully impregnated, thereby preventing brake squeal for a longer time.

In the tenth embodiment shown in FIG. 19, a second protecting cover 60 is fitted to the forward surface of the porous plate 91 opposed to the pad in the same manner as in the sixth embodiment (FIGS. 13 to 14). Cover 60 has a bottom surface parallel to said surface of plate 91 and the pad backing plate 51. The inner bottom surface of said cover 60 contacts the forward surface of plate 91 and the inner peripheral surface of the side wall 602 of said cover 60 is fitted to the outer peripheral surface of the plate 91 over a projection of the soft rubber boot 72.

The forward surface of plate 91 is covered by member 60 to prevent grease from leaking out or evaporating, and to prevent damage by entrance of water or dust from outside. Thus, the grease is maintained in pure condition for a long time.

During braking the frictional force between opposed contact surfaces of the pad backing plate 51 and the protecting cover 60 is large and they vibrate together, while the frictional force between the inner bottom surface of the protecting cover 60 and the porous plate 91 is very small because of the lubrication by the grease on said surfaces. Thus the protecting cover 60 slides relative to the plate 91 because of elasticity of the soft rubber holding boot 72, whereby the same results as obtained as described for the sixth and eighth embodiments are achieved.

The porous plate may be fixed to the forward end of the piston or closely inserted into the concave portion of the piston, but when it is loosely inserted with a clearance as in FIGS. 17 to 19, brake squeal is prevented more effectively, and the setting and removing of the porous plate can be done more easily.

In a modification of the ninth and tenth embodiments, the porous plate 91 inserted into a concave portion of the piston may be formed without a projection, that is, it may be flat, and a cylindrical protecting cover with bottom may be fitted to cover the side peripheral surface and the bottom surface of such plate.

The present invention as described above can be simply and inexpensively applied in pads and pistons of the conventional disc brakes and therefore it can be widely used.

When a porous plate of sintered metal powder such as iron, iron-carbon and nickel powder is used as an intermediate member for retaining lubricating material, it is possible to achieve a damping effect of the sintered plate, long maintenance of grease and excellent braking as mentioned in the first embodiment.

As an intermediate member, a metal plate retaining lubricating material, and constructed to prevent the lubricant from leaking away even when the surface of the plate has reached a high temperature by frictional heat generated during braking may be used. Desirably the plate must have sufficient strength to endure the pressing force applied between the piston and the pad upon braking, and it must not be compressible. For example, grid-like, circular or spiral grooves or holes, may be used in the plate to retain the lubricant.

The invention contemplates use as lubricating materials not only oils and fats such as grease, but metal powders having lubricating nature such as disulphuric molybdenum. A mixture of grease and disulphuric molybdenum, or the like, can also be used.

For a protecting cover, a metal plate which does not rust or which is treated with rust prevention is used, including for example, stainless steel, chrome plated iron plate, nickel plated iron plate and the like.

For illustration of embodiments of the present invention, descriptions have been made with reference to disc brakes of Gerling type and Dunlop type, but the present invention can be applied in any preferred type of the disc brake and desired modifications are possible without departing from the spirit and scope of the invention.

We claim:

1. A disc brake including a rotatable disc, a caliper straddling a portion of the periphery of said disc, a pad of friction material associated with said caliper and opposed to said disc, an axially movable piston in said caliper, and pressure fluid actuating means for moving said piston to force said pad into frictional engagement with said disc for braking action, in combination with an intermediate member molded in the form of a plate of sintered metal powder and impregnated with lubricating material positioned between the opposed surfaces of said pad and piston, whereby to reduce the friction between the pad and piston, prevent torsional vibrations, and eliminate brake squeal.

2. A disc brake according to claim 1, wherein said intermediate member is secured to said piston.

3. A disc brake according to claim 1, wherein said intermediate member is secured to said pad.

4. A disc brake according to claim 1, wherein said intermediate member is impregnated with grease as said lubricating material.

5. A disc brake according to claim 1, wherein said pad has a backing plate and said intermediate member is a plate formed of sintered iron powder which is secured to said backing plate.

6. A disc brake according to claim 1, wherein a portion of said intermediate member is inserted in a concave portion provided in the piston, and another portion of the intermediate member is provided with a surface adapted during braking to contact said pad.

7. A disc brake according to claim 6, wherein a heat-resisting fiber impregnated with lubricating material is provided in the space between said intermediate member and said concave portion in the piston.

8. A disc brake according to claim 6, wherein said intermediate member is a plate formed in an annular shape having the same inner and outer diameters as the forward end of the piston and is rigidly fixed to the forward end of the piston, said intermediate member being impregnated with grease.

9. A disc brake according to claim 8, wherein the density of sintered material is lower in the middle part than in the peripheral part of said plate and asbestos impregnated with grease is filled into the interior space of the piston and contained between said plate, the cylindrical wall and the bottom of the piston.

10. A disc brake according to claim 1, wherein said piston is provided with a concave portion and an annular forward end portion opposed to said pad, said intermediate member having an annular stepped portion on its periphery which is secured to said annular end portion of the piston, and said intermediate member is provided with a tray surrounded by said annular stepped portion of the piston for retaining the lubricating material impregnated in the intermediate member.

11. A disc brake according to claim 10 wherein a heat-resisting fiber impregnated with a lubricant is provided to fill the space between said intermediate member and said tray.

12. A disc brake according to claim 10, wherein an oilproof soft rubber ring is further provided between an inner surface of the wall of said tray and a sidewall of a projection of said intermediate member.

13. A disc brake according to claim 12, wherein the depth of said tray is increased to form a space between the projection of said intermediate member and the inner bottom surface of the tray and said space is filled with asbestos fiber including grease.

* * * * *